United States Patent [19]
Hurd

[11] Patent Number: 5,740,282
[45] Date of Patent: Apr. 14, 1998

[54] SYSTEM AND METHOD FOR CONTRACTIVE MAPPING RESYNCHRONIZATION OF A DATA TRANSMISSION

[75] Inventor: Lyman P. Hurd, Atlanta, Ga.

[73] Assignee: Iterated Systems, Inc., Atlanta, Ga.

[21] Appl. No.: 497,218

[22] Filed: Jun. 30, 1995

[51] Int. Cl.$^6$ ............................................. G06K 9/00
[52] U.S. Cl. ............................................ 382/248; 382/233
[58] Field of Search ................................ 382/249, 233, 382/232, 235, 236, 237, 238, 239, 248, 250, 252, 253, 190, 195, 203, 209, 217, 224, 234, 240, 241, 242, 243, 244, 251, 254, 274, 275, 276, 282, 309; 345/202; 395/136; 358/433, 467

[56] References Cited

U.S. PATENT DOCUMENTS

| | | | |
|---|---|---|---|
| 4,794,455 | 12/1988 | Ericsson | 358/135 |
| 4,941,193 | 7/1990 | Barnsley et al. | 382/56 |
| 5,065,447 | 11/1991 | Barnsley et al. | 382/56 |
| 5,212,549 | 5/1993 | Ng et al. | 358/135 |
| 5,347,600 | 9/1994 | Barnsley et al. | 382/249 |

FOREIGN PATENT DOCUMENTS

| | | | |
|---|---|---|---|
| 0416918A2 | 3/1991 | European Pat. Off. | H04N 6/13 |
| 0490538A2 | 6/1992 | European Pat. Off. | H04N 7/137 |
| 0521529A3 | 1/1993 | European Pat. Off. | H04N 7/13 |
| 0622959A1 | 11/1994 | European Pat. Off. | H04N 7/137 |

*Primary Examiner*—Leo Boudreau
*Assistant Examiner*—Bijan Tadayon
*Attorney, Agent, or Firm*—Morris, Manning & Martin, L.L.P.

[57] ABSTRACT

A system and method for contractively mapping decompressed images to facilitate resynchronization of data transmission is provided. This system includes a transmitter having a data compressor, a decompressor, and a contractive mapper. The receiver for the data transmission includes a decompressor and contractive mapper. The decompressor and contractive mapper of the transmitter provide the compressor with the same information which the decompressor at the receiver is using to decompress data. In this manner, the compressor may accurately represent the incoming frame data in terms of the contractively mapped decompressed data. The contractive mapper attenuates information in the decompressed data frame to prevent the persistence of erroneous data at the receiver should data become corrupted during transmission or the transmission be interrupted. The contractive mapping is preferably achieved with an affine map contracting scheme which is preferably implemented by a scalar multiplication.

21 Claims, 4 Drawing Sheets

SYSTEM AND METHOD FOR CONTRACTIVE MAPPING RESYNCHRONIZATION OF A DATA TRANSMISSION

FIELD OF THE INVENTION

This invention relates to data transmission systems, and more particularly, to data transmission systems which compress data.

BACKGROUND OF THE INVENTION

Data transmissions are implemented in a number of applications. One example of data transmission is video conferencing where video data are typically generated, one frame at a time, by video cameras or the like and transmitted via wireless or wired communication paths to a remote site. At the remote site, the transmitted data frames are converted into signals for driving an image device to display images corresponding to video data generated at the transmission site.

Another example of data transmission is a cable TV network. In CATV systems, video data is typically generated at a headend and provided in frames over trunks to distribution nodes and then through feeder lines to consumer sites, such as the homes of subscribers. There the video frame data is converted at each consumer's site to signals which may be used to drive a subscriber's TV set. Frequently, the conversion of the signals involves descrambling the signals before they are used to drive the subscriber's TV set. Other examples of data transmission systems include communication data systems in which digital data representing voice or other information are organized into frames or packets before being sent to a receiver or the like.

In an effort to improve the amount of data which may be transmitted over a communication conduit in a data transmission system, data is frequently compressed. The compression of data within the art is well known and may be done by a variety of methods. For example, variations of a Discrete Cosine Transform (DCT) method may be used in accordance with JPEG and MPEG standards. Other data compression methods frequently used for data compression include fractal transform systems and iterated function system compression methods. All of these methods tend to reduce the amount of data transmitted through the system without a loss of information that appreciably degrades the usefulness of the data after it is decompressed.

The implementation of these methods in a data transmission system requires that a compressor be located at the data transmission site and a decompressor be located at the receiver site. The data at the transmission site is generated one frame at a time with a typical frame generation rate of 30 frames per second for video data. Typically, the compressor receives a generated frame, compresses the frame, and transmits the compressed representation of the frame data to the remote site. The decompressor at the receiver site decompresses the compressed representation and provides the uncompressed data to another device for use. In many of the systems implementing the methods discussed above, the compressed representations do not contain the same type of data elements contained in the frame, but rather, a set of equation coefficients which approximately describe the information comprised of the data elements in the data frame. These coefficients are used by the decompressor to regenerate a data frame that approximates the data frame represented by the original frame data. Because the coefficients require fewer elements for their representations, the amount of data to be transmitted is reduced.

One way to further reduce the data necessary to represent the frame data is to utilize a previous frame or its representation to represent a current frame. For example, at the frame generation rates described above, there may be relatively little difference between one frame and the next frame. As a result, the next frame may be more efficiently represented by computing the equation coefficients such that the coefficients represent operations to be performed on the previous frame which generate the current frame. Such methods are commonly known as interframe compression methods. While this method takes advantage of related data frames to facilitate data compression, such methods suffer from the limitation that the decompressed data frames quickly diverge from the frame data being generated because, in many applications, the decompressor at the receiver site does not decompress the compressed representation to the exact frame data generated at the transmission site. Rather, the decompressor generates an approximation of the frame data generated at the transmission site because some of the methods discussed above and their equivalents are lossy. Lossy data compression methods do not regenerate data which are an exact match of the data being generated at the transmission site. Thus, the compressor may generate compressed representations based upon the actual frame data of a previous frame or its compressed representation while the decompressor uses different decompressed data to decompress a current compressed representation.

To overcome this limitation, most compressors also use a decompressor like the one at the receiver site in a feedback path. The decompressor at the transmission site receives the compressed representation transmitted to the receiver which represents the current frame being generated. This representation is then used by both decompressors to generate decompressed frame data. For the next frame, the compressor computes the representation from the previous decompressed frame to approximate the current frame. The decompressed frame used at the transmission site should be the same as the decompressed frame generated by the decompressor at the receiver. In this manner, the compressor is synchronized to the decompressor at the receiver site.

This method and system works well as long as the data frames generated by the decompressor at the transmission site are the same as those generated by the decompressor at the receiving site. However, problems may occur in the transmission of the compressed representations which result in discrepancies between the decompressed data at the receiver and transmission sites. For example, electrical noise may be induced into the transmitted signal which may corrupt one or more of the data elements of the compressed representation and affect the decompression of the compressed data at the receiver site. While this discrepancy may be small for the current frame being received, systems using compressors and decompressors which do not contractively map every data element propagate this error and the later decompressed data frames depart very quickly from those decompressed at the transmission site. That is, the compressor continues to send compressed representations based upon the decompressed frames being generated at the transmission site while the decompressor is using the received representations to generate decompressed frames based upon the errant frames previously decompressed. When this error occurs, most systems have the receiving site generate an error signal which the transmitting site uses to flush the decompressed data buffer at the transmission site and restart the data transmission at the next frame. The decompressor at the receiver also flushes its buffer and, at the transmission of the next compressed representation, the decompressors at the transmitting and receiving site are synchronized. Of course, because the first frame transmitted following such an error must be represented in terms of the first frame data generated and not the differences between a current frame and a previous one, the time to compute the compressed representation is increased and resynchronization is delayed. This method also requires a bi-directional control signal path between the receiving and transmitting sites and may cause a significant interruption in the data transmission before the error is detected and resynchronization occurs.

Another method for synchronizing a transmitter compressor and receiver decompressor is to use a compressor which generates the compressed representation for each frame based only upon the informational content of the current frame. Such frames are typically known as intraframes. Thus, this type of system does not require resynchronization because each compressed representation transmitted is sufficient to generate one decompressed frame without reference to a previously compressed frame. As a result, an error in the decompression of one frame does not propagate to successive decompressed frames since the representations of the frames are independent. However, this method and system suffers from the limitation that known methods of computing a compressed representation for each frame may be time intensive and may be inadequate to support the necessary bandwidth for the data transmission.

Another method for resynchronization incorporates the generation of a completely self-referential data frame periodically. When synchronization is lost, the receiver simply waits for the next self-referential frame to resynchronize the transmission. While this method does not require the generation of intraframes for each frame, it still requires more processing time to generate the self-referential frames than frames that are interdependent. It also limits resynchronization to the fixed intervals at which the intraframes are generated.

What is needed is a way to synchronize a transmitter compressor and a receiver decompressor so the compressor compresses frame data in accurate correspondence with information being generated at the decompressor. What is needed is a way of compressing frame data using the informational content of previously decompressed frames which permit resynchronization without restarting the data transmission.

SUMMARY OF THE INVENTION

The above-noted limitations are overcome by using a data compression/decompression method and system constructed in accordance with the principles of the present invention. The method includes the steps of compressing a first frame of data and transmitting the compressed representation to a receiving site, decompressing the compressed representation at the receiving site and at the transmitting site, contractively mapping the decompressed frames at the receiving and the transmitting sites, and providing the contractively mapped decompressed frame to the compressor at the transmitting site so that the compressor generates a compressed representation of a next frame of data in correspondence with the contractively mapped decompressed frame. The contractive mapping of each decompressed frame causes the information from previous decompressed frames to decay exponentially so that an error in the decompression of one frame at a receiver does not continue to propagate through subsequent decompressions of other compressed representations.

A system implementing the method of the present invention includes a data transmitter at a transmission site and a data receiver at a receiving site. The data transmitter includes a compressor, a first decompressor, and a first contractive mapper. The data receiver includes a second decompressor and a second contractive mapper. The output of the first compressor is coupled to the input of the second decompressor at the data receiver and to the input of the first decompressor at the data transmitter. The output of the decompressor at the data transmitter is coupled to the input of the first contractive mapper and the output of the first contractive mapper is coupled to an input of the first compressor. The first compressor also includes an input for frame data. The output of the second decompressor of the data receiver is coupled to a device which uses the decompressed data and to the input of the second contractive mapper. The output of the second contractive mapper is coupled to a second input of the second decompressor.

Initially, the contractive mapper in both the data transmitter and receiver is, preferably, initialized with the decompressed representation of the first data frame. As a result, the first compressor compresses the next frame of data by generating a compressed representation based on the first frame to generate the compressed representation of the next frame. The compressed representation is then transmitted to the second decompressor at the receiver and also coupled to the first decompressor at the transmitting site. The decompressed data is used to drive a device at the receiving site and is also input to the second contractive mapper. The second contractive mapper then contractively maps the data to itself and provides the contractively mapped data to an input of the second decompressor. In a similar manner, the compressed data is decompressed by the first decompressor at the transmitting site and supplied to the first contractive mapper which in turn provides the contractively mapped data to an input of the first compressor. For the next frame of data, the compressor generates a compressed representation of a new data frame based on the contractively mapped data of the previous frame. This compressed representation is then transmitted to the receiving site for decompression using the contractively mapped data of the second contractive mapper.

The contractive mapper of the present invention maps data values from a decompressed data frame to a contractive mapper buffer such that the data values in the contractive mapper buffer are mapped to a contrast range that is less than that for the frame prior to contractive mapping. Thus, the contractive mapper reduces the amount of information in the contractively mapped data from that in the decompressed data. However, this reduction is not so great as to prevent the compressed representation of the next frame of data to be based on the previous decompressed data frame, but it does sufficiently attenuate the information in the decompressed data that errors eventually dissipate. In this manner, the system may continue to operate despite an erroneous transmission with little degradation in the quality of the decompressed data. Preferably, the contractive mapper utilizes affine maps to contractively map the decompressed data, although other contractive mapping methods may be used.

The contractive mapper of the present invention also synchronizes a receiver to an ongoing transmission in a quick and efficient manner. When a receiver having the contractive mapper of the present invention joins an ongoing transmission, the decompressor at the receiver erroneously decompresses the data because the decompressor has not received the previous data representations being used to generate decompressed representations at the receiver. However, as the erroneous data dissipates, more and more correct information is retained until the decompressor at the transmitter and receiver are in synchronization. As a result, no special restart procedure is required to join an ongoing transmission. For example, a receiver may perform a checksum verification of transmitted data before decompressing the data. If the checksum does not verify that the data was transmitted correctly, the data is not used. In previously known systems, this causes the data buffer at the decompressor to differ from the one at the compressor. To get the process resynchronized, the receiver waits for an intraframe transmission. With the present invention, the decompressor can continue to decompress data with some degradation in the quality of the decompressed data but within a few frames the data buffers at the compressor and decompressor contain the same data and the process is resynchronized.

The use of the contractive mapper attenuates a discrepancy between the decompressed image at the receiving site and the decompressed image at the transmission site over a relatively low number of frames so that resynchronization of the data transmission is achieved without selecting a frame and restarting the transmission stream. The method and system achieve this resynchronization while utilizing a compressive scheme that represents a current frame of data in terms of previous decompressed frames. As these methods require less time and resources than methods that compress a frame in terms of its own content, the system of the present invention supports higher bandwidths with quicker resynchronization times than most interframe compression methods.

These and other advantages of the present invention may be discerned from reading the following detailed description of the invention and accompanying drawings.

BRIEF DESCRIPTION OF THE DRAWINGS

The present invention may take form in various components and arrangement of components and in various steps and arrangement of steps. The drawings are only for purposes of illustrating a preferred embodiment and are not to be construed as limiting the invention.

DETAILED DESCRIPTION OF THE INVENTION

Figure 1:
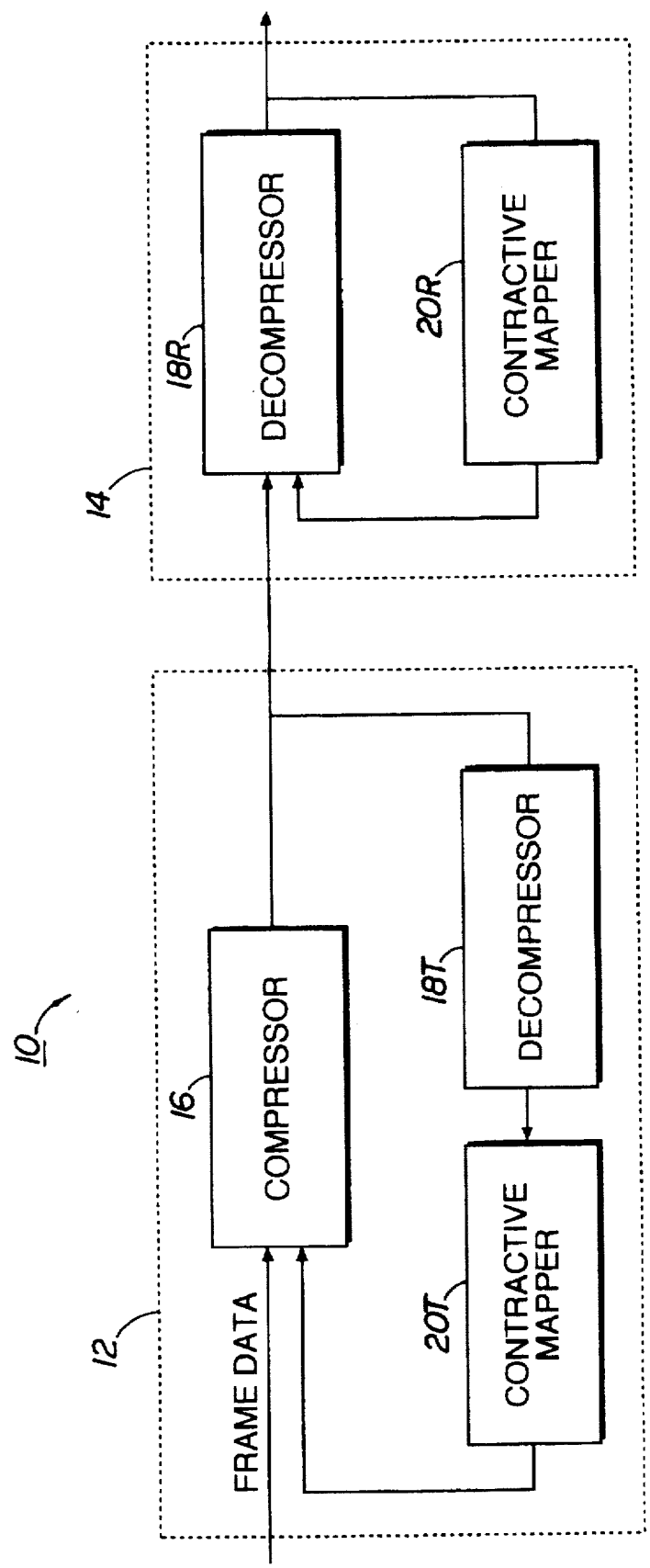
FIG. 1 is block diagram of a system using the contractive mapping resynchronization method of the present invention.

The system for implementing the contractive mapping resynchronization of the present invention is shown in FIG. 1. That system 10 is comprised of a data transmitter 12 and a data receiver 14. Transmitter 12 receives frame data one frame at a time from a data generation source (not shown), compresses the frame data, and transmits the compressed frame data via any of a number of known transmission methods to receiver 14 for decompression and use in driving a device coupled to the output of receiver 14. Transmitter 12 further includes a compressor 16, a decompressor 18T, and a contractive mapper 20T. Likewise, receiver 14 includes a decompressor 18R and a contractive mapper 20R. The numbers for the decompressor and contractive mappers in both the transmitter and the receiver are the same since the construction of these components are the same in both the receiver 14 and transmitter 12, respectively, and the letter designation distinguishes the location of the component.

In the system shown in FIG. 1, frame data may be generated by a video camera or the like, although other data generation sources may be coupled to the input of transmitter 12. This frame data is then compressed by compressor 16 in correspondence with the contents of contractive mapper 20T. That is, the frame data is expressed as a function of the contents of a contractive mapper buffer within contractive mapper 20. This interframe type of data compression is preferred because previous frames of data in a transmission stream such as a video data transmission are usually related to one another. As a result, the compression of a current data frame with reference to a prior data frame is efficient in terms of time and computing resources.

The compressed data frame is transmitted to decompressor 18R at receiver 14 and is also coupled to decompressor 18T at transmitter 12. Both decompressors 18R, 18T perform the inverse function of the compressor 16 to generate a decompressed data frame. However, both decompressors 18T, 18R perform the decompression in a lossy manner and the decompressed data frame is not an exact representation of the data frame prior to compression. The loss of data in the decompression procedure does not significantly degrade the informational content of the decompressed data so it may still be effectively utilized at the receiver site. The decompressed data in both the receiver and transmitter are then coupled to contractive mappers 20R, 20T, respectively. Each contractive mapper 20R, 20T contractively maps the decompressed data frame to a contractive mapper buffer within the respective contractive mapper. This mapping is performed in a matter discussed in more detail below. The contractive mapping performed by mappers 20R, 20T attenuate the informational content of the decompressed data without eradicating its relationship to the next data frame arriving for compression. Thus, compressor 16 may effectively utilize the data in the contractive mapper buffer of mapper 20T to compress the next data frame for transmission to receiver 14. By incorporating decompressor 18T and a contractive mapper 20T in transmitter 12, transmitter 12 replicates receiver 14 so compressor 16 compresses data based upon an accurate representation of the decompressed data available to decompressor 18R.

Compressor 16 is of a type well-known in the art. Such compressors do not contractively map each pixel or data element of the frame data to be compressed. For example, compressors using DCT, wavelet and like methods do not contract the informational content of each data element. As a result, decompressors performing the inverse function for such compressors permit errors in the decompressed data to persist once introduced in the process unless the error is completely eliminated and the process restarted. To resynchronize a compressor and decompressor using such methods without restarting the transmission at some selected point, the present invention includes a contractive mapper which operates on substantially all of the data values in a decompressed data frame to attenuate the informational content of the elements comprising the decompressed data frame. Thus, compressor 16 and decompressors 18T, 18R perform processes or the inverse thereof which do not contractively map each element of the incoming data such as DCT, wavelet or other similar methods.

Contractive mappers 20 preferably use a contractive map such as affine maps. A preferred contractive mapping function is a scalar multiplication of the data values in the decompressed frame. For the mapping function $\phi$ to be contractive it must satisfy the equation:

$$|\phi(x)-\phi(y)|<p|x-y| \text{ where } 0<p<1$$

The values x and y are pixel values in the decompressed data frame and the values $\phi(x)$ and $\phi(y)$ are the corresponding pixel values in the contractively mapped data frame. By using such a contractive mapping function, the informational content of the decompressed frame is attenuated before being used to compress the next frame of data. The attenuation of the discrepant data at the decompressor of receiver 14 is expressed mathematically as:

$$d(F''_{i+n}, F_{i+n}) \leq p^n d(F''_i, F_i)$$

Where $F_i$ is the decompressed image at the transmitter 12, $F''_i$ is the decompressed image at receiver 12, and d is the largest discrepant pixel value between the decompressed frames at the transmitter and receiver. Thus, as n increases $p^n$ gets smaller, which means the discrepant pixel value is practically reduced to zero in subsequent data frames.

When the contractive factor, p, is approximately zero, compressor 16 operates more like a compressor which expresses a frame of data in terms of the content of the current frame only. As a result, resynchronization takes place at the next frame following an error since each frame transmission relies more on the informational content of the current data frame than of a prior data time. However, the time to compress the time data is increased. In such a case, the time to compute the compressed representation requires more resources and time since very little information from the prior data frame remains for encoding the current data frame. Where p is approximately one, the informational content of the decompressed data frame persists so that the resources and time for generating the compressed representation is significantly lowered. However, using p at this end of the range means that the informational content of a previous decompressed data frame persists longer than when p is at a lower value. Where an error in transmission between transmitter 12 and receiver 14 has occurred, this persistence in the informational content of the corrupted decompressed data frame means that it takes a greater number of data frames before the erroneous information attenuates to zero and the data transmission is resynchronized. Thus, p preferably lies closer to one than to zero to save time in the compression of the frame data and provide an improvement in the resynchronization time over known methods which do not utilize any contractive mapper. For a video compression transmission system operating at approximately 10 frames a second, the preferred value of p lies in the range of ½ to $127/128$.

In one aspect of the invention, the scalar factor used by contractive mappers 20T, 20R may be adjustable to compensate for transmission line conditions or the like. For example, when data is transmitted over cellular telephone links, electrical noise is more likely. Thus, the scalar factor is selected to be in the lower end of the range. For transmissions over land lines or the like, the scalar factor may be selected to be closer to 1 since less noise is likely to interfere with the data transmission. The adjustment of the scalar factor may be preselected before a transmission begins or it may be done in response to a signal indicating that the condition of the transmission line has changed.

In the event that the transmission stream between transmitter 12 and receiver 14 is disrupted, the contractive mapper of the present invention permits the receiver and transmitter to resynchronize more quickly than in previously known systems. That is, the first data frame received after the transmission disruption results in a decompressed data frame which substantially deviates from the frame data compressed at transmitter 12 because the contractive mapper 20R reinitializes to the last complete frame received prior to transmission stream disruption. However, this erroneously decompressed data frame is attenuated by contractive mapper 20R before being presented to decompressor 18R for the next data frame decompression. As a result, the next decompressed data frame more closely represents the received compressed frame data. This second frame of decompressed data is attenuated by contractive mapper 20R. This second contractive mapping further attenuates the erroneous data of the first decompressed frame following transmission disruption, and, to a lesser extent, attenuates the data of the second decompressed data frame. Thus, the data value of the second decompressed data frame dominates the information in the contractive mapping buffer of mapper 20 so that the third decompressed data frame at the receiver more closely approximates the third data frame generated at the transmitter following transmission disruption. This process continues iteratively until the informational content of the previous erroneous data frames attenuates to zero and the more accurate decompressed data is being used to generate decompressed data frames.

Figure 2:
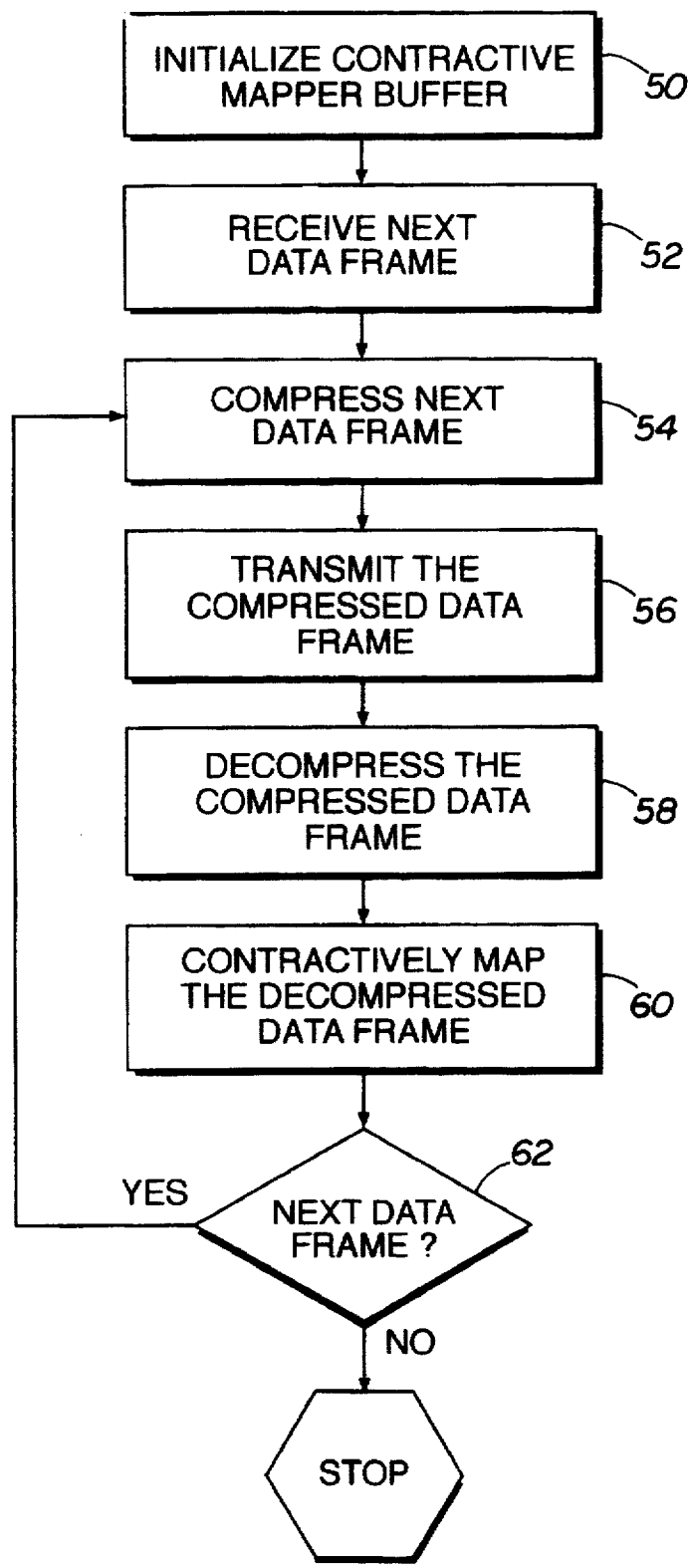
FIG. 2 is a flow chart of a data compression method utilizing contractive mapping.

The method of compressing frame data according to the present invention is shown in FIG. 2. The compressing method begins by initializing the contents of the mapper buffer in the contractive mapper to an initial value (Block 50). Preferably, the contractive mapper buffer is initialized to the first frame data. The compressor uses the data in the mapper buffer to compress the next data frame received by any of a number of known compressing methods (Blocks 52, 54). The compressed representation is then transmitted to a receiver and provided to the decompressor at the transmitter for decompression (Blocks 56, 58). The decompressed frame is contractively mapped to the contractive mapper buffer in the contractive mapper (Block 60). If a next data frame is available (Block 62), the process continues with the compressor compressing the data frame using the contents of the contractive mapper buffer (Block 54). This process continues until no data frames remain to be compressed.

Figure 3:
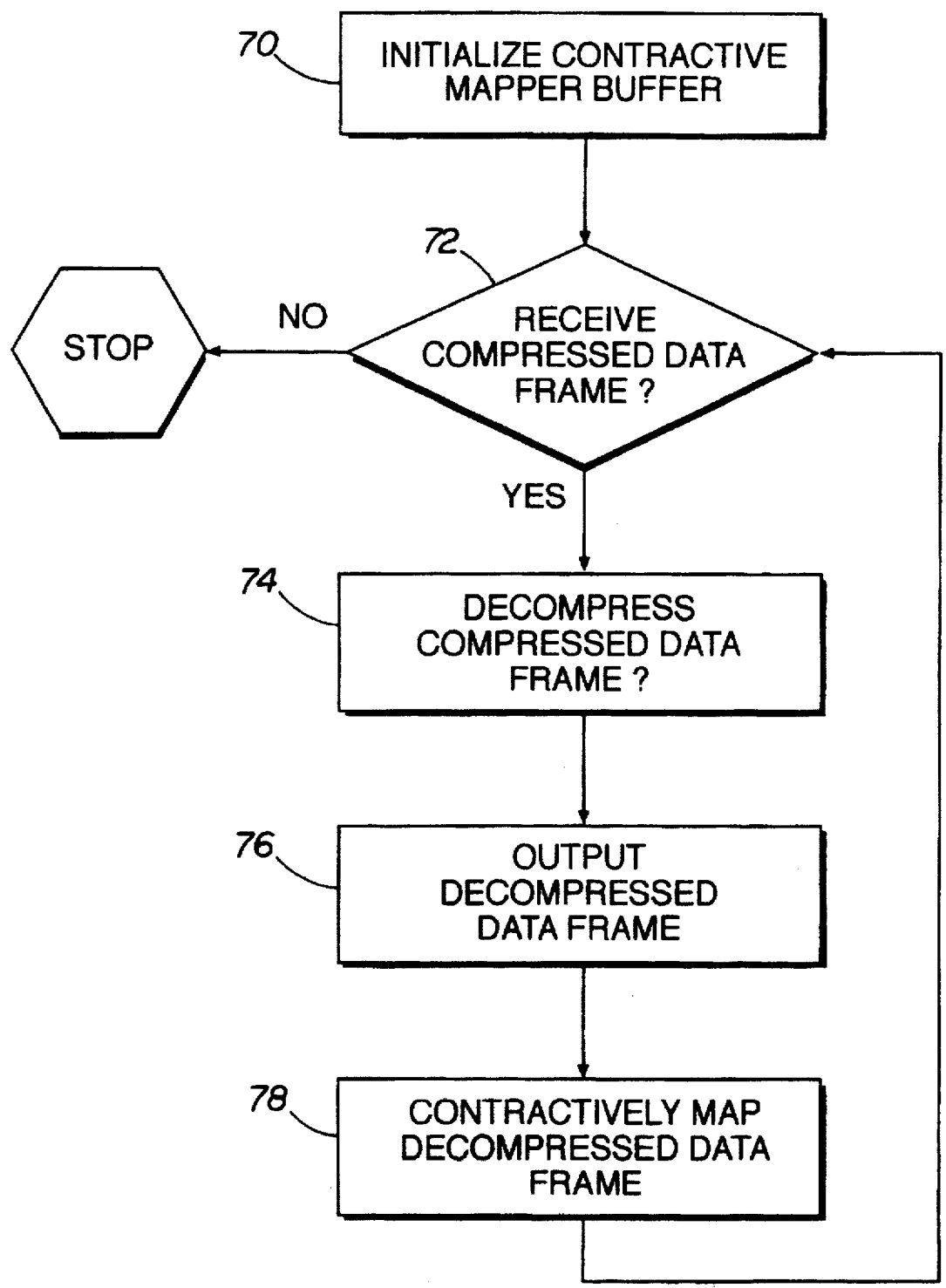
FIG. 3 is a flow chart of a decompression method utilizing contractive mapping.

The method of decompressing frame data according to the present invention is shown in FIG. 3. The decompressing method begins by initializing the mapper buffer in the contractive mapper to an initial value (Block 70). Preferably, this initial data value for each element in the buffer corresponds to the pixels of the first decompressed data frame. Alternatively, each pixel of the contractive mapper buffer may be initialized to pixels having a value which is a mid-range gray scale value. When a compressed frame is received (Block 72), the decompressor uses the data in the mapper buffer to decompress the compressed frame by the inverse method used by the compressor at the transmitter (Block 74). The decompressed representation is sent to a device for use (Block 76) and also provided to the contractive mapper where the contractive mapping function is then applied to the decompressed data and stored in the contractive mapping buffer (Block 78). If a next data frame is received (Block 72), the process continues with the compressor compressing the data frame using the contents of the contractive mapper buffer. This process continues until the data frame transmission is terminated. This same method is used when a transmission is disrupted, except the contractive mapper buffer is initialized with the last frame decompressed since it probably bears some relationship to the next compressed frame received when transmission reception resumes.

Preferably, the methods shown in FIGS. 2 and 3 are implemented with a computer program written in WATCOM C/C++ Version 9.5. Preferably, compressor 16 and decompressors 18 are implemented with a computer program written in that same language and are executed on a IBM PC compatible computer having at least a 80486 processor running at 66 MHz with 16 megabytes of RAM and 500 megabytes of disc drive space available. Likewise, contractive mapper 20 may be implemented on a computer platform separate from compressor 16 on decompressors 18T, 18R. Preferably, contractive mapper 20 is implemented in a computer program in the WATCOM C/C++ language executing on the same computer implementing compressor 16 and decompressors 18T, 18R.

Figure 4:
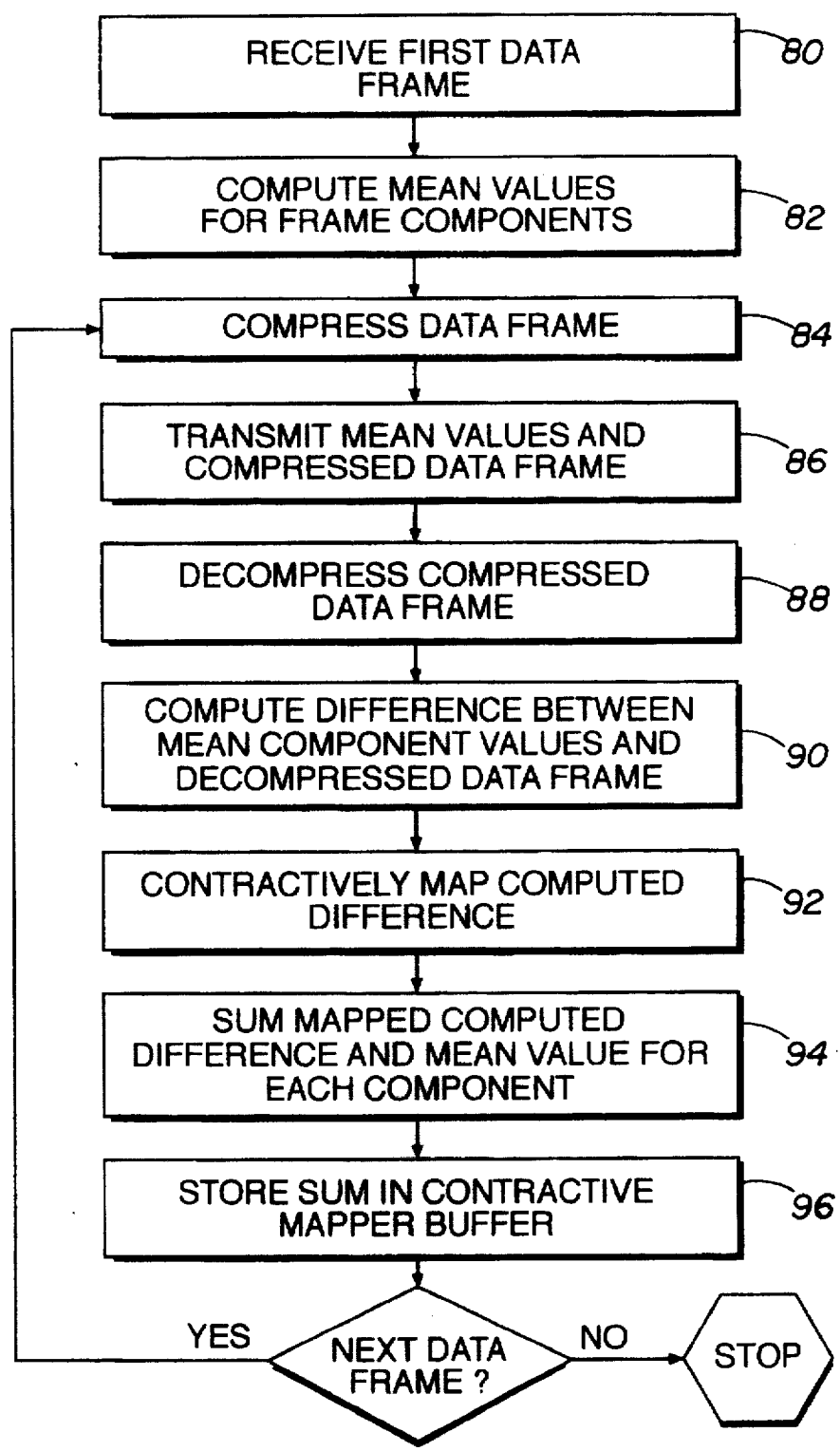
FIG. 4 is a flow chart of a data compression method utilizing contractive mapping for multi-dimensional data.

As discussed above, the contractive mapping function for gray scale data preferably uses a scalar multiplication factor. For data having multiple dimensions, such as color video data, a preferred method includes computing a mean value for each component color of the first data frame to be compressed and using that information to contractively map the decompressed frames. Such a method is shown in FIG. 4 and shows the receipt of a first data frame (Block 80) and the computation of mean values for its components (Block 82). The components may be the color components of the video data or combination thereof such as luminance and chrominance. For example, the first frame of color video data may be used to compute a mean value for the red pixels, green pixels, and blue pixels. Following compression of the first data frame (Block 84), the compressed representation and the mean values of the first frame are transmitted to the receiver (Block 86). Following decompression of the compressed frame (Block 88), mean values of the components are used to calculate the difference between the pixel or element values of the decompressed frame for each component and the mean value for the components of the first frame (Block 90) and this difference is contractively mapped, preferably, by scalar multiplication (Block 92). The results of that multiplication are added to the mean value for the components of the first data frame (Block 94) to arrive at a contractively-mapped value for the pixels stored in the contractive mapper buffer (Block 96). Mathematically, these relationships may be expressed for the red, green, and blue components of a video image as:

$$red = k*(r - rmean) + rmean$$

$$green = k*(g - gmean) + gmean$$

$$blue = k*(b - bmean) + bmean \text{ where } k < 1$$

Thus, this contractive mapping scheme causes the contractively mapped data to be distributed about the mean value for the red, green and blue mean values for the first frame of data. Thus, the data are mapped into a contrast range about one of the mean values. Another alternative similar to this method is to compute the mean for each color component of each frame and use those mean values to contractively map the decompressed data. However, this method requires the transmission of the mean values of the color components with each compressed representation. This data overhead, of course, impacts, to some extent, the bandwidth of the transmission.

While the present invention has been illustrated by the description of a preferred and alternative embodiments and processes, and while the preferred and alternative embodiments and processes have been described in considerable detail, it is not the intention of the applicant to restrict or in any way limit the scope of the appended claims to such detail. Additional advantages and modifications will readily appear to those skilled in the art. For example, the present invention may be used with any type of data transmission system which organizes data into frames so the invention is not limited to video or other image data systems. The invention in its broadest aspects is therefore not limited to the specific details, preferred embodiment, and illustrative examples shown and described. Accordingly, departures may be made from such details without departing from the spirit or scope of applicant's general inventive concept.

What is claimed is:

1. A system for synchronizing a compressed data transmission comprising:
   a transmitter including
   a compressor for compressing a data frame into a compressed representation,
   a first decompressor for decompressing said compressed representation by performing the inverse function of said compressor,
   a first contractive mapper for contractively mapping said decompressed representation so that said compressor may compress a next data frame using said contractively mapped decompressed representation; and
   a receiver including
   a second decompressor for decompressing said compressed representation received from said compressor of said transmitter, and
   a second contractive mapper for contractively mapping said decompressed representation of said received data frame so that errors in said decompressed representation are attenuated to facilitate resynchronization with said transmitter; and
   wherein said first and second contractive mapper perform scalar multiplication of substantially all elements in the decompressed representation of the received frame data to contractively map the decompressed image and where the scalar multiplication is adjustable to compensate for transmission line conditions.

2. The system of claim 1 wherein said first and second contractive mappers use affine maps to contractively map data values of said decompressed representation.

3. The system of claim 1 wherein said scalar multiplication is performed with a scalar having a value between 0 and 1.

4. The system of claim 1 wherein said scalar multiplication is performed with a scalar having a value of $15/16$.

5. The system of claim 1 wherein a scalar for said scalar multiplication may be selected prior to or during a data transmission.

6. A method for compressing a data frame to facilitate resynchronization with a receiver in the event of data transmission error comprising the steps of:
   initializing a contractive mapper buffer to an initial value;
   compressing a frame of data using said contractive mapper buffer;
   decompressing said compressed frame of data;
   contractively mapping said decompressed frame of data by performing scalar multiplication, using a scalar, on the elements of the decompressed representations to attenuate the informational content of the elements of said decompressed frame of data; said scalar being adjustable to accommodate for transmission line conditions; and
   repeating said compressing, decompressing, and contractively mapping steps for successive frames of data so that each successive compressed representation represents a frame of data based on said contractively mapping of a prior decompressed frame of data so that said compressor is synchronized with a receiver having a decompressor and a contractive mapper.

7. The method of claim 6 wherein said contractively mapping step contractively maps said decompressed representation using affine maps.

8. The method of claim 6 wherein said scalar is between 0 and 1.

9. The method of claim 8 wherein said scalar is $15/16$.

10. The method of claim 6 wherein said initializing step further comprises the step of:

assigning each element of said contractive mapper buffer with a corresponding element in a first frame of data.

11. The method of claim 6 wherein said initializing step further comprises the step of:

assigning each element of said contractive mapper buffer a midrange gray scale value.

12. The method of claim 6 wherein said initializing step further comprises the step of:

assigning each component element of said contractive mapper buffer with a mean value of each component element in a first frame of data.

13. The method of claim 12 wherein said contractively mapping step further comprises the step of:

adding said mean value for each component element in said first frame of data to the difference between said mean value for each said component element and a value for a corresponding component element in said decompressed representation, thereby producing a sum for each component, and assigning each sum to a corresponding element of said contractive mapper buffer.

14. A method for decompressing a data frame to facilitate resynchronization with a receiver in the event of data transmission error comprising the steps of:

initializing a contractive mapper buffer to an initial value;

decompressing a received compressed frame of data;

contractively mapping said decompressed frame of data by performing scalar multiplication, using a scalar, on the elements of the decompressed representations to attenuate the informational content of the elements of said decompressed frame of data; said scalar being adjustable to accommodate for transmission line conditions;

repeating said decompressing and contractively mapping steps for successive frames of data so that each successive decompressed representation represents a frame of data based on said contractively mapping of a prior decompressed frame of data so that said decompressor does not permit errors in said decompressed representation to persist.

15. The method of claim 14 wherein said contractively mapping step contractively maps said decompressed representation using affine maps.

16. The method of claim 14 wherein said scalar is between 0 and 1.

17. The method of claim 16 wherein said scalar is $15/16$.

18. The method of claim 14 wherein said initializing step further comprises the step of:

assigning each element of said contractive mapper buffer with a corresponding element in a first frame of data.

19. The method of claim 14 wherein said initializing step further comprises the step of:

assigning each element of said contractive mapper buffer a midrange gray scale value.

20. The method of claim 14 wherein said initializing step further comprises the step of:

assigning each component element of said contractive mapper buffer with a mean value of each component element in a first frame of data.

21. The method of claim 20 wherein said contractively mapping step further comprises the step of:

adding said mean value for each component element in said first frame of data to the difference between said mean value for each said component element and a value for a corresponding component element in said decompressed representation, thereby producing a sum for each component, and assigning each sum to a corresponding element of said contractive mapper buffer.

* * * * *